(12) United States Patent
Nazarpoor

(10) Patent No.: US 9,216,382 B2
(45) Date of Patent: Dec. 22, 2015

(54) METHODS FOR VARIATION OF SUPPORT OXIDE MATERIALS FOR ZPGM OXIDATION CATALYSTS AND SYSTEMS USING SAME

(71) Applicant: Zahra Nazarpoor, Camarillo, CA (US)

(72) Inventor: Zahra Nazarpoor, Camarillo, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 129 days.

(21) Appl. No.: 13/911,998

(22) Filed: Jun. 6, 2013

(65) Prior Publication Data

US 2014/0271393 A1 Sep. 18, 2014

Related U.S. Application Data

(63) Continuation-in-part of application No. 13/856,896, filed on Apr. 4, 2013, and a continuation-in-part of application No. 13/849,185, filed on Mar. 22, 2013, and a continuation-in-part of application No. 13/891,647, filed on May 10, 2013.

(60) Provisional application No. 61/791,721, filed on Mar. 15, 2013.

(51) Int. Cl.
| | | |
|---|---|---|
| *B01D 50/00* | (2006.01) | |
| *B01D 53/94* | (2006.01) | |
| *B01J 23/00* | (2006.01) | |
| *B01J 37/02* | (2006.01) | |
| *B01J 23/68* | (2006.01) | |

(52) U.S. Cl.
CPC ............ *B01D 53/944* (2013.01); *B01J 23/002* (2013.01); *B01J 23/688* (2013.01); *B01J 37/0242* (2013.01); *B01D 2255/104* (2013.01); *B01D 2255/2063* (2013.01); *B01D 2255/2073* (2013.01); *B01D 2255/402* (2013.01); *B01D 2255/65* (2013.01); *B01D 2258/01* (2013.01); *B01J 2523/00* (2013.01)

(58) Field of Classification Search
CPC ............................. B01D 53/94; B01D 53/945
USPC .................................... 422/177, 180
See application file for complete search history.

(56) References Cited

U.S. PATENT DOCUMENTS

| | | | |
|---|---|---|---|
| 2002/0042341 A1* | 4/2002 | Golden .................. | 502/303 |
| 2004/0166035 A1* | 8/2004 | Noda .................. | B01D 53/94 422/180 |
| 2006/0292342 A1* | 12/2006 | Ohno et al. .................. | 428/116 |
| 2009/0324468 A1* | 12/2009 | Golden et al. .............. | 423/210 |
| 2009/0324469 A1* | 12/2009 | Golden .................. | B01D 53/945 423/212 |
| 2011/0053763 A1* | 3/2011 | Verdier .............. | B01D 53/8628 502/242 |

* cited by examiner

*Primary Examiner* — Tom P Duong
(74) *Attorney, Agent, or Firm* — Barnes & Thornburg LLP; Edward F. Behm, Jr.; Thomas J. McWilliams

(57) ABSTRACT

Disclosed here are methods of preparing zero platinum group metal catalysts systems with different support oxide material. A ZPGM catalyst system may include a substrate and a washcoat and an impregnation layer, wherein said impregnation layer may include the ZPGM pervoskite catalyst and the washcoat layer may include the support oxides material. Suitable support oxides material may include $ZrO_2$, $ZrO_2$ doped with lanthanide group metals, $Nb_2O_5$, $Nb_2O_5$—$ZrO_2$, $Al_2O_3$ and $Al_2O_3$ doped with lanthanide group metals, $TiO_2$ and doped $TiO_2$ or mixtures thereof.

6 Claims, 4 Drawing Sheets

METHODS FOR VARIATION OF SUPPORT OXIDE MATERIALS FOR ZPGM OXIDATION CATALYSTS AND SYSTEMS USING SAME

CROSS-REFERENCE TO RELATED APPLICATIONS

This application claims priority to U.S. Provisional Application No. 61/791,721, filed Mar. 15, 2013, titled Methods for Oxidation and Three-way ZPGM Catalyst Systems and Apparatus Comprising Same and is a continuation-in-part of U.S. application Ser. No. 13/856,896, filed Apr. 4, 2013, titled System and Method for Two and Three Way Mixed Metal Oxide ZPGM Catalyst, and is related to U.S. application Ser. No. 13/849,185, filed Mar. 22, 2013, titled ZPGM Catalyst Systems and Methods of Making Same and to U.S. application Ser. No. 13/891,647, filed May 10, 2013, titled ZPGM Diesel Oxidation Catalysts and Methods of Making and Using Same, the entireties of which are incorporated herein by reference as if set forth herein.

BACKGROUND

1. Technical Field

This disclosure relates generally to catalytic converters and, more particularly to catalytic converters which are free of any platinum group metals.

2. Background Information

Emission standards for unburned contaminants, such as hydrocarbons, carbon monoxide and nitrogen oxide, continues to become more stringent. In order to meet such standards, diesel oxidation catalysts are used in the exhaust gas lines of internal combustion engines. These catalysts promote the oxidation of unburned hydrocarbons and carbon monoxide as well as the oxidation of nitrogen oxides in the exhaust gas stream to reduce the engine generated pollutants. One of the major limitations of current catalysts is that the Platinum Group Metals (PGM) used in their fabrication have very high demand and increasing prices.

Therefore, there is a continuing need to provide cost effective catalyst systems that provide sufficient conversion so that HC, NOx, and CO emission standards can be satisfied.

SUMMARY

Diesel Oxidation ZPGM catalyst systems are disclosed. ZPGM catalyst systems may oxidize toxic gases, such as carbon monoxide, hydrocarbons and nitrogen oxides that may be included in exhaust gases.

In one embodiment, ZPGM catalyst systems may oxidize NO to $NO_2$ which may be used for the oxidation of carbon soot.

ZPGM catalyst converters may include: a substrate, a washcoat, and an impregnation layer. Washcoats may include at least support oxides material and may include ZPGM catalysts. Impregnation layers may include ZPGM catalysts.

Suitable known in the art chemical techniques, deposition methods and treatment systems may be employed to form the disclosed ZPGM catalyst systems.

Suitable materials for use as substrates may include cordierite, metallic alloys, foams, microporous materials, zeolites or combinations.

Materials suitable for use as ZPGM catalysts include Lanthanum (La), Silver (Ag), Manganese (Mn) and combinations thereof. The disclosed ZPGM DOC systems may include perovskite structures with the characteristic formulation $ABO_3$ or related structures.

Support oxide materials of use in catalysts containing one or more of the aforementioned combinations may also include $ZrO_2$, doped $ZrO_2$ with Lanthanide group metals, $Nb_2O_5$, $Nb_2O_5$—$ZrO_2$, alumina and doped alumina, $TiO_2$ and doped $TiO_2$.

Type of support oxide material in ZPGM catalyst system significantly influences the performance of ZPGM catalyst with perovskite structure $La_{1-x}Ag_xMnO_3$ under diesel oxidation condition.

Numerous other aspects, features and advantages of the present disclosure may be made apparent from the following detailed description, taken together with the drawing figures.

BRIEF DESCRIPTION OF THE DRAWINGS

Embodiments of the present disclosure are described by way of example with reference to the accompanying figures, which are schematic and are not intended to be drawn to scale. Unless indicated as representing prior art, the figures represent aspects of the present disclosure.

DETAILED DESCRIPTION

Figure 1:
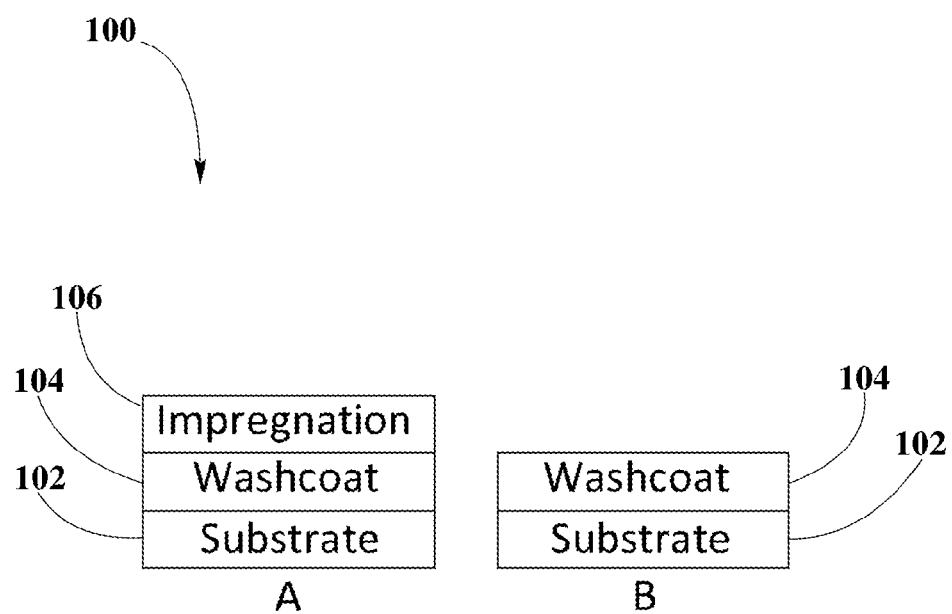
FIG. 1 shows ZPGM catalyst system structures, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITIONS

As used here, the following terms have the following definitions:

"Exhaust" refers to the discharge of gases, vapor, and fumes including hydrocarbons, nitrogen oxide, and/or carbon monoxide.

"Impregnation" refers to the process of totally saturating a solid layer with a liquid compound.

"Wash-coat" refers to at least one coating including at least one oxide solid that may be deposited on a substrate.

"Conversion" refers to the chemical alteration of at least one material into one or more other materials.

"T50" refers to the temperature at which 50% of a material is converted.

"Oxidation Catalyst" refers to a catalyst suitable for use in oxidizing at least hydrocarbons and carbon monoxide.

"Zero Platinum Group (ZPGM) Catalyst" refers to a catalyst completely or substantially free of platinum group metals.

"Platinum Group Metals (PGMs)" refers to platinum, palladium, ruthenium, iridium, osmium, and rhodium.

DESCRIPTION OF THE DRAWINGS

Various example embodiments of the present disclosure are described more fully with reference to the accompanying drawings in which some example embodiments of the present disclosure are shown. Illustrative embodiments of the present disclosure are disclosed herein. However, specific structural and functional details disclosed herein are merely representative for purposes of describing example embodiments of the present disclosure. This disclosure however, may be embodied in many alternate forms and should not be construed as limited to only the embodiments set forth herein.

System Configuration and Composition

FIG. 1 depicts ZPGM catalyst system 100 configurations, according to various embodiments. As shown in FIG. 1A, ZPGM catalyst system 100 may include a substrate 102, a washcoat 104, and an impregnation layer 106, where washcoat 104 or impregnation layer 106, or both, may contain active oxidation ZPGM catalyst components. FIG. 1B shows an embodiment of ZPGM catalyst system 100 that includes a substrate 102 and a washcoat 104 only, where washcoat 104 may include the active oxidation ZPGM catalyst components.

According to an embodiment, ZPGM catalyst system 100 may include a perovskite structure having the general formula $ABO_3$ or related structures resulting from the partial substitution of the A site. Partial substitution of the A site with M element will yield the general formula $A_{1-x}M_xBO_3$. "A" may include yttrium, lanthanum, strontium, or mixtures thereof. "B" may include a single transition metal, including manganese, cobalt, chromium, or a mixture thereof. M may include silver, iron, Cerium, niobium or mixtures thereof; and "x" may take values between 0 and 1. The perovskite or related structure may be present in about 1% to about 30% by weight.

Methods of Preparation of Washcoat and Impregnation Layers

Figure 2:
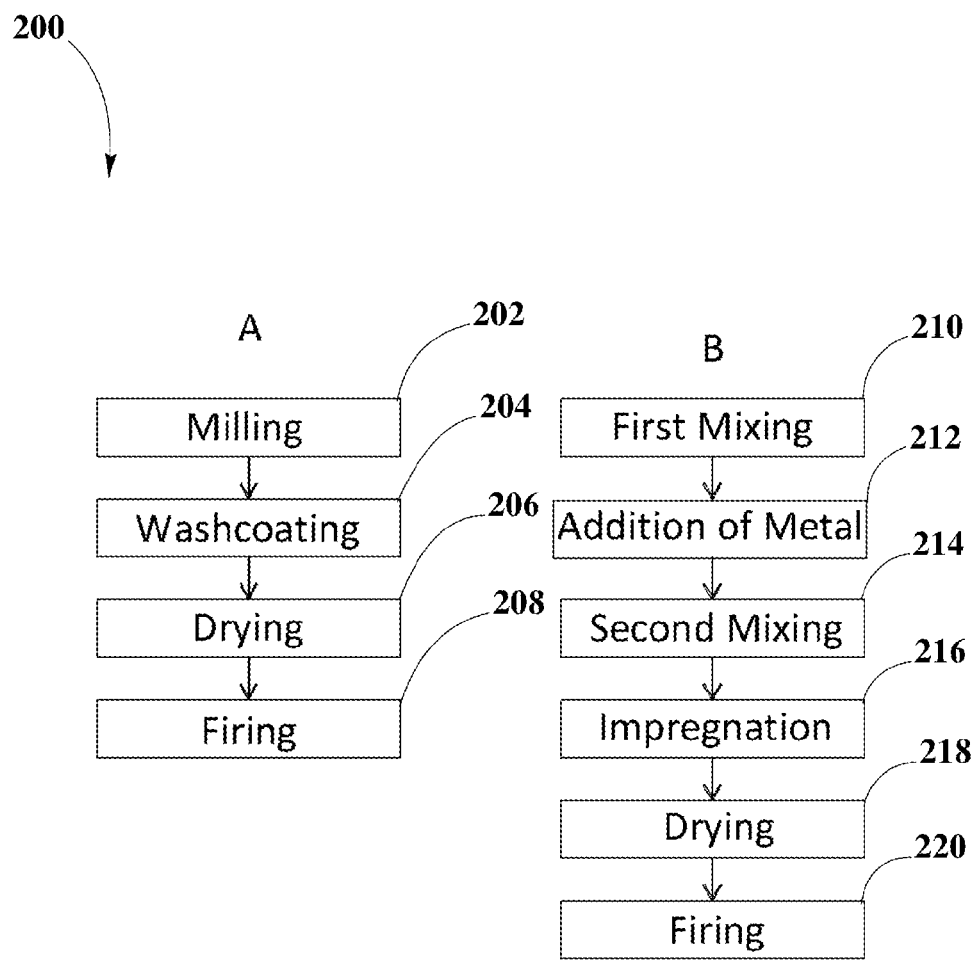
FIG. 2 is a flowchart of a method of preparation of a ZPGM catalyst, according to an embodiment.

FIG. 2 illustrates method for preparation 200 of ZPGM catalyst system 100, according to an embodiment.

In one embodiment, method for preparation 200 may be a two-step process. FIG. 2 A is a washcoat 104 preparation process. In this process, components of washcoat 104 may undergo a milling 202 process in which washcoat 104 materials may be broken down into smaller particle sizes; the mixture may include water, a suitable binder material and a support oxide material or OSM, or both. Suitable support oxide material may include $ZrO_2$, doped $ZrO_2$ with Lanthanide group metals, $Nb_2O_5$, $Nb_2O_5$—$ZrO_2$, $Al_2O_3$ and doped $Al_2O_3$, $TiO_2$ and doped $TiO_2$ or mixtures thereof. After milling 202 process, an aqueous slurry may be obtained. Milling 202 process may take from about 10 minutes to about 10 hours, depending on the batch size, kind of material and particle size desired. In one embodiment of the present disclosure, suitable average particle size (APSs) of the slurry may be of about 4 microns to about 10 microns, in order to get uniform distribution of washcoat 104 particles. Finer particles may have more coat ability and better adhesion to substrate 102 and enhanced cohesion between washcoat 104 and impregnation layers 106. Milling 202 process may be achieved by employing any suitable mill such as vertical or horizontal mills. In order to measure exact particle size desired during milling 202 process, laser light diffraction equipment may be employed.

After milling 202 process the aqueous slurry may be coated onto a suitable substrate 102 in washcoating 204 step. In this step, the aqueous slurry may be placed on substrate 102 in any suitable manner. For example, substrate 102 may be dipped into the slurry, or the slurry may be sprayed on substrate 102. Other methods of depositing the slurry onto substrate 102 known to those skilled in the art may be used in alternative embodiments. If substrate 102 is a monolithic carrier with parallel flow passages, a washcoat 104 may be formed on the walls of the passages. Followed by a drying 206 step, in which the washcoated substrate 102 may be dried at room temperature. Afterwards, the washcoated substrate 102 may undergo a firing 208 stage, in which the washcoated substrate 102 may be fired at a temperature ranging from 400° C. to 700° C., for approximately 2 hours to 6 hours.

FIG. 2 B is a flowchart of an impregnation preparation method. The process may start with first mixing 210 step, where a lanthanum nitrate solution may be added to a manganese nitrate solution and the solutions may be mixed for a suitable amount of time at room temperature. In some embodiments first mixing 210 process may last from 1 hour to 5 hours. Afterwards, during addition of metal 212 step, a silver nitrate solution or other suitable metal solutions may be added to the mixture of lanthanum nitrate and manganese nitrate; then the solution may be mixed at room temperature for about 1 hour to 5 hours, during second mixing 214. When the mixture is ready, it may undergo impregnation 216 process, where the mixture may be impregnated onto a previously washcoated substrate 102. Subsequently, impregnated substrate 102 may be subjected to a drying 218 process and a firing 220 process. Firing 220 process may last between 3 hours and 6 hours, and may be performed and a temperature between 600° C. and 800° C.

Various amounts of washcoats 104 and impregnation layers 106 may be coupled with a substrate 102, preferably an amount that covers most of, or all of, the surface area of a substrate 102. In an embodiment, about 60 g/L to about 250 g/L of a washcoat 104 may be coupled with a substrate 102.

Other components such as acid or base solutions or various salts or organic compounds may be added to the aqueous slurry to adjust the rheology of the slurry and enhance binding of the washcoat 104 and impregnation layer 106 to the substrate 102.

EXAMPLES

In example #1, a ZPGM catalyst system 100 including a ZPGM perovskite catalyst having a cordierite substrate 102, a washcoat 104 and an impregnation layer 106 is prepared. Where washcoat 104 includes Praseodymium-doped Zirconium oxide, $ZrO_2$—$Pr_6O_{11}$. $ZrO_2$—$Pr_6O_{11}$ is used as support oxide material which contains $ZrO_2$ from 80 to 95 percent by weight, preferably 90 percent by weight and $Pr_6O_{11}$ from 5 to 20 percent by weight, preferably 10 percent by weight. Catalyst system is free of OSM material. Washcoat 104 may include a binder or small amount rheology adjustment additives. Rheology adjustment additives may include acids, among other suitable substances. Following deposition of washcoat, heat treatment may be performed at about 550° C. and may last from about 4 hours. The washcoat loading may be about 80 g/L to about 180 g/L, preferably 120 g/L. The impregnation layer 106 includes at least lanthanum, silver and manganese. This catalyst system is free of any oxygen storage material. The lanthanum in impregnation layer 106 is present in about 10% to about 40%, by weight. The silver in impregnation layer 106 is present in about 1% to about 10%, by weight. The manganese in impregnation layer 106 is present in about 10% to about 30%, by weight. After impregnation 216 the ZPGM catalyst system 100 may be heat treated at about 750° C. for about 4 hours. The resulting ZPGM catalyst system 100 has a perovskite structure $La_{1-x}Ag_xMnO_3$.

Figure 3:
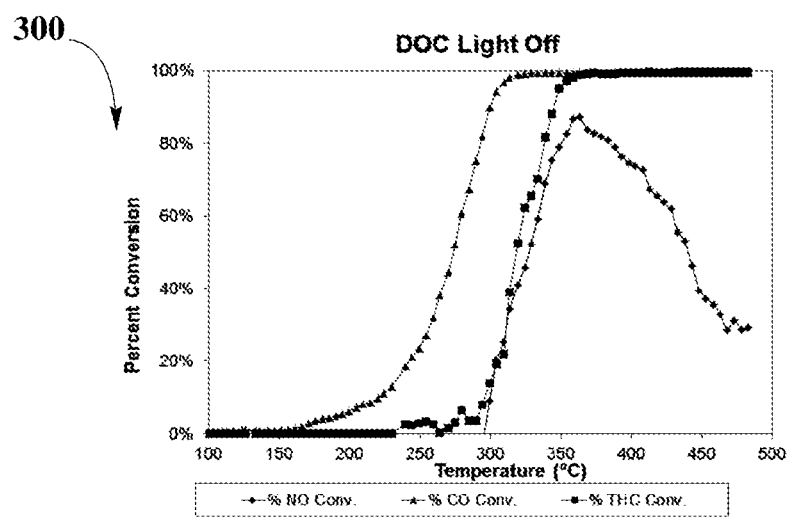
FIG. 3 shows DOC light-off test results of a ZPGM catalyst system, according to an embodiment.

FIG. 3 shows the light-off test results 300 for the ZPGM catalyst system 100 of example #1 for a fresh sample. The light-off test is performed under simulated Diesel exhaust. Feed stream includes of 150 ppm NO, 1500 ppm of CO, 430 ppm of $C_3H_6$ as hydrocarbon, 4% $CO_2$, 4% of $H_2O$ and 14% of oxygen. The test is performed by increasing the temperature from about 100° C. to 400° C. at a constant rate of 20° C./min. The light-off test results 300 show that T50 for CO may be at about 273° C., T50 for HC may be at about 318° C. and T50 for NO may be at about 328° C. The NO conversion is result of oxidation of NO to $NO_2$. Neither $NH_3$ nor $N_2O$ formed during reaction.

In example #2, a ZPGM catalyst system 100 including a ZPGM perovskite catalyst having a cordierite substrate 102, a washcoat 104 and an impregnation layer 106 is prepared. Where washcoat 104 includes Lanthanum-doped alumina, $Al_2O_3$—$La_2O_3$. $Al_2O_3$—$La_2O_3$ is used as support oxide material which contains $Al_2O_3$ from 80 to 95 percent by weight, preferably 90 percent by weight and $La_2O_3$ from 5 to 20 percent by weight, preferably 10 percent by weight. Catalyst system is free of OSM material. Washcoat 104 may include a binder or small amount rheology adjustment additives. Rheology adjustment additives may include acids, among other suitable substances. Following deposition of washcoat, heat treatment may be performed at about 550° C. and may last from about 4 hours. The washcoat loading may be about 80 g/L to about 180 g/L, preferably 120 g/L. The impregnation layer 106 includes at least lanthanum, silver and manganese. This catalyst system is free of any oxygen storage material. The lanthanum in impregnation layer 106 is present in about 10% to about 40%, by weight. The silver in impregnation layer 106 is present in about 1% to about 10%, by weight. The manganese in impregnation layer 106 is present in about 10% to about 30%, by weight. After impregnation 216 the ZPGM catalyst system 100 may be heat treated at about 750° C. for about 4 hours. The resulting ZPGM catalyst system 100 has a perovskite structure $La_{1-x}Ag_xMnO_3$.

Figure 4:
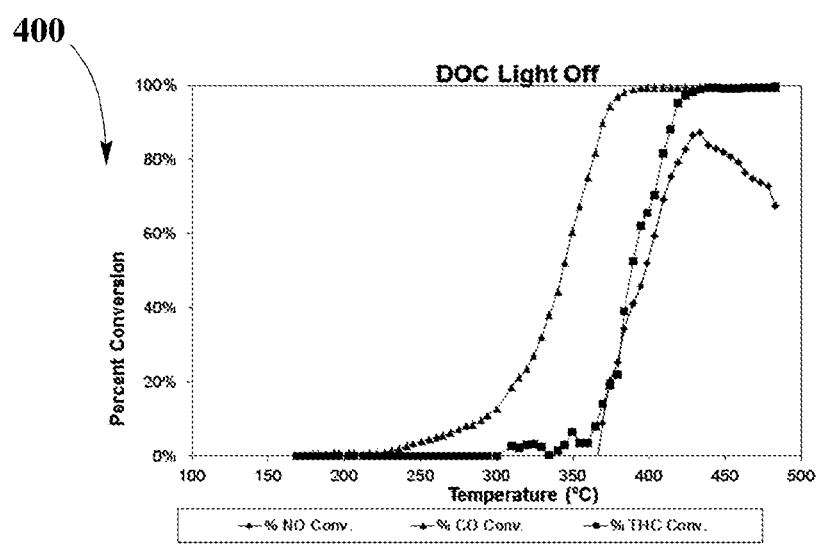
FIG. 4 shows SOC light-off test results of a ZPGM catalyst system, according to an embodiment.

FIG. 4 shows the light-off test results 400 for the ZPGM catalyst system 100 of example #2 for a fresh sample. The light-off test is performed under simulated Diesel exhaust condition. Feed stream includes of 150 ppm NO, 1500 ppm of CO, 430 ppm of $C_3H_6$ as hydrocarbon, 4% $CO_2$, 4% of $H_2O$ and 14% of oxygen. The test is performed by increasing the temperature from about 100° C. to 400° C. at a constant rate of 20° C./min. The light-off test results 400 show that T50 for CO may be at about 343° C., T50 for HC may be at about 388° C. and T50 for NO may be at about 398° C. The NO conversion is result of oxidation of NO to $NO_2$. Neither $NH_3$ nor $N_2O$ formed during reaction.

Comparison of DOC light-off test results of ZPGM catalysts of Example#1 and Example#2 shows the type of support oxide material in ZPGM catalyst system significantly influences the activity of ZPGM catalyst with perovskite structure $La_{1-x}Ag_xMnO_3$ under Diesel oxidation condition. Doped-$ZrO_2$ support shows superior activity in CO, HC and NO oxidation compare to doped-$Al_2O_3$ support.

What is claimed is:

1. A catalyst system, comprising:
   a substrate;
   a washcoat suitable for deposition on the substrate, comprising Praseodymium-doped Zirconium oxide; and
   an impregnation layer, comprising at least one second catalyst;
   wherein the at least one second catalyst comprises about 1% to about 10% by weight silver about 10% to about 40% by weight lanthanum, and about 10% to about 30% by weight manganese.

2. The catalyst system of claim 1, wherein the at least one second catalyst comprises about 1% to about 10% by weight silver, about 10% to about 40% by weight lanthanum, and about 10% to about 30% by weight manganese.

3. A catalyst system, comprising:
   a substrate:
   a washcoat suitable for deposition on the substrate, comprising at least one oxide solid selected from the group consisting of a carrier material oxide, at least one first catalyst, and a mixture thereof; and
   an impregnation layer, comprising at least one second catalyst;
   wherein the at least one second catalyst includes a perovskite structured compound of the general formula $La_{1-x}Ag_xMnO_3$ wherein x is from 0 to 1;
   wherein the at least one second catalyst comprises about 1% to about 10% by weight silver, about 10% to about 40% by weight lanthanum, and about 10% to about 30% by weight manganese.

4. The catalyst system of claim 3, wherein the at least one oxide solid is $ZrO_2$—$Pr_6O_{11}$.

5. The catalyst system of claim 4, wherein the $ZrO_2$—$Pr_6O_{11}$ comprises about 80 to about 95 percent by weight $ZrO_2$ and about 5 to about 20 percent by weight $Pr_6O_{11}$.

6. The catalyst system of claim 5, wherein the $ZrO_2$—$Pr_6O_{11}$ comprises about 90 percent by weight $ZrO_2$ and about 10 percent by weight $Pr_6O_{11}$.

* * * * *